Figures 1, 4:
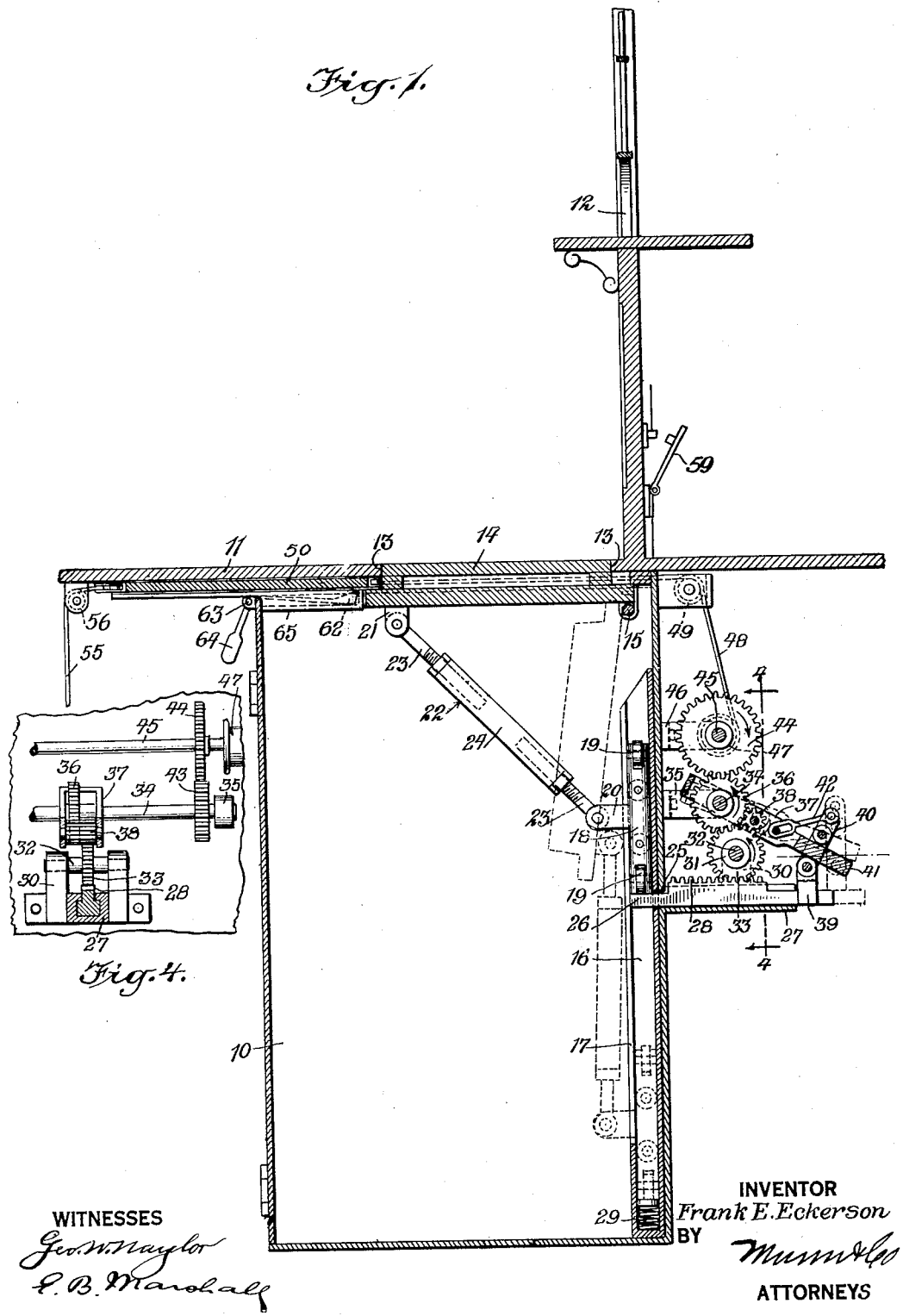

Aug. 8, 1933.  F. E. ECKERSON  1,921,967
BURGLAR TRAP
Filed Aug. 10, 1931  2 Sheets-Sheet 1

WITNESSES
Geo. W. Naylor
P. B. Marshall

INVENTOR
Frank E. Eckerson
BY
Munn & Co
ATTORNEYS

Aug. 8, 1933.   F. E. ECKERSON   1,921,967
BURGLAR TRAP
Filed Aug. 10, 1931   2 Sheets-Sheet 2
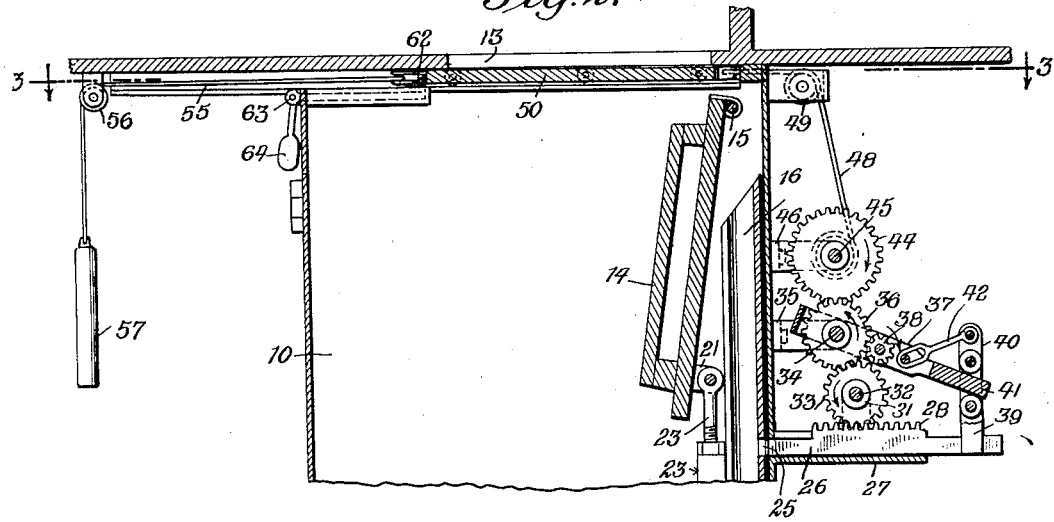
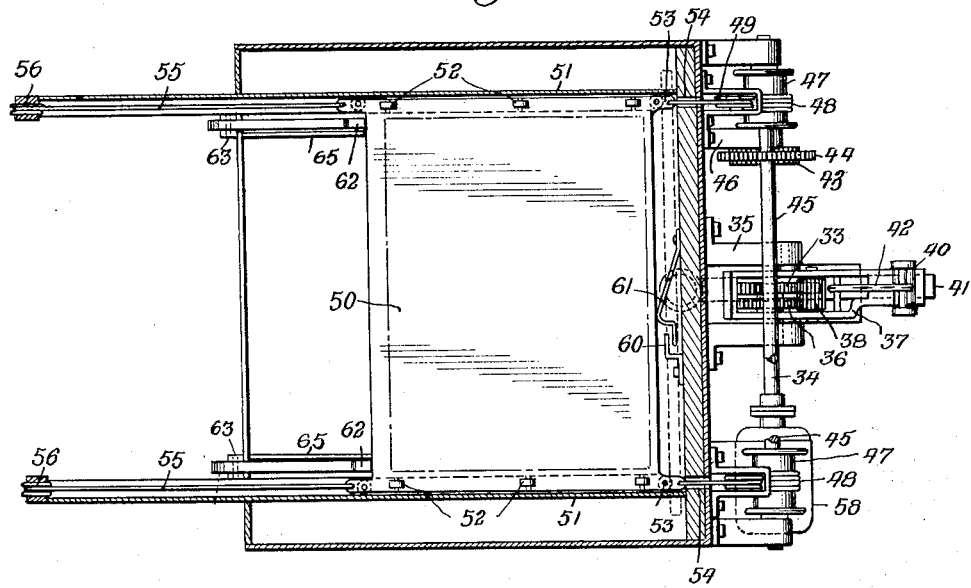
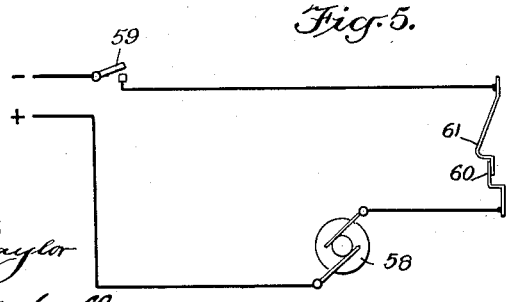
INVENTOR
Frank E. Eckerson

UNITED STATES PATENT OFFICE 1,921,967

BURGLAR TRAP

Frank E. Eckerson, Pittsfield, Mass.

Application August 10, 1931. Serial No. 556,293

12 Claims. (Cl. 43—59)

An object of the invention is to provide a burglar trap having a cage disposed below a floor with the top of the cage movable but normally held to form a portion of the floor, with means to free the top of the cage and permit it to descend into the body of the cage with the burglar. The cage will preferably be disposed below the floor at the front of a counter or cashier's window, with the means to free the top of the cage within reach of the teller or cashier. With a knowledge that the burglar is on the top of the cage, the teller or cashier may divert the attention of the burglar by handing to him the money or securities demaned and at this time the trap may be operated to permit the top of the cage to descend into the body of the cage with the burglar and any money or securities which may have been given to him.

Another object of the invention is to provide the cage with an auxiliary top which will preferably be constructed of metal, the auxiliary top being moved into position and locked by means provided as the main top of the cage descends into the body of the cage. As the body of the cage is preferably constructed of metal, the burglar will find himself confined within a metal cage when the trap is operated.

Still another object of the invention is to provide an electric motor with means to free the main top of the cage and to move the auxiliary top in position, the electric motor having a circuit with a switch which may be readily reached by the teller or cashier. The connection of the electric motor with the means to free the main top is such that the said means is disconnected after the electric motor has run a few seconds, when the electric motor will continue to move quickly the auxiliary top into locked position, which will serve to open the circuit.

Additional objects of the invention will appear in the following specification, in which the preferred form of the invention is described.

In the drawings similar reference characters refer to similar parts in all the views, of which Figure 1 is a side sectional view illustrating the subject matter of this application, Figure 2 is a sectional fragmentary view similar to the view illustrated in Figure 1, but with the main top member lowered and with the top of the cage closed by the auxiliary top member, Figure 3 is a sectional view on the line 3—3 of Figure 2, Figure 4 is a sectional view on the line 4—4 of Figure 1, and Figure 5 is a diagrammatc view illustrating the circuit for operating the motor.

By referring to the drawings it will be seen that the cage 10 is disposed under the floor 11 at the front of the cashier's or teller's window 12 and it will also be seen that the cage 10 has an opening 13 in its top which is normally closed by a member 14 which is hinged at 15, the member 14 having its upper face of the same construction as the floor 11 and forming a continuation of the said floor, so that an examination of the floor in front of the cashier's window 12 will not indicate that there is a burglar trap or similar device below the floor.

In the cage 10, preferably below the hinge 15, there is a guideway 16, the guideway having a vertical slot 17, and in this guideway 16 there is a bearing member 18 having roller bearings 19 engaging the sides of the guideway 16, the bearing member 18 also having an arm 20 extending through the slot 17 which is connected with an arm 21 depending from the member 14 by a link 22, this link 22 being articulated to the arms 20 and 21. The link 22 is preferably constructed with threaded members 23 articulated to the arms 20 and 21, the threaded members 23 being connected by a turnbuckle 24 in a manner well understood.

Extending through the cage 10 and the guideway 16, there is an opening 25 in which is disposed a bar 26, the bar 26 being movable in a guideway 27 and having rack teeth 28. The bar 26 is disposed under the bearing member 18, as illustrated in Figure 1 of the drawings, when the member 14 is disposed upwardly to close the opening 13, but when the bar 26 is moved out of the guideway 16, the bearing member 18 is permitted to fall, together with the member 14. There is preferably a spring 29 at the bottom of the guideway 16, with which the guide member 18 will engage when it descends.

A bracket 30 extends upwardly from the sides of the guideway 27, the bracket having bearings 31 in which a shaft 32 is journaled, there being mounted on the shaft 32 a gear 33 which meshes with the rack teeth 28 on the bar 26. There is a shaft 34 journaled in bearings in brackets 35 secured to the cage 10, a gear 36 being secured to the shaft 34 and an arm or movable frame 37 being articulated to the shaft 34. The gear 36 meshes with a gear 38 mounted for rotation on the arm or movable frame 37, and the gear 38 normally meshing with the gear 33, the direction of rotation of these gears being indicated by the arrows in Figures 1 and 2 of the drawings. Articulated to a stud 39 on the bar 26, there is a link 40 having a bearing through which the end 41 of the arm or movable frame 37 is disposed, so that when the bar 26 moves out of the guideway 16, it will serve to raise the link 40 to the position shown by the dotted lines in Figure 1 of the drawings, which will raise the arm or movable frame 37 to free the gear 38 from the gear 33. There is preferably a link 42 which connects the top of the link 40 with the arm or movable frame 37, so that the link 40 will move from the position shown by the full lines in Figure 1 of the drawings to the position shown in the dotted lines in the said figure, when the bar 26 moves from the position shown by the full lines to the position shown by the dotted lines.

As will best be seen by referring to Figure 4 of the drawings, there is another gear 43 secured to the shaft 34, this gear 43 meshing with a gear 44 secured to a shaft 45 journaled in bearings on brackets 46 extending from the cage 10. The shaft 45 is provided with two pulleys 47 and secured to the pulleys 47, to be wound thereon, there are cables 48, the cables 48 passing over pulleys 49 and being connected with an auxiliary top member 50. This auxiliary top member 50 is disposed for moving in guideways 51 at the sides of the top of the cage 10, the auxiliary top member 50 being preferably provided with rollers 52 which engage the guideways 51 and which serve to give the auxiliary top member 50 an easy movement in the guideways. The cables are secured to the auxiliary top member 50 at 53, the cables extending through openings 54 in the cage 10. Preferably secured to the rear of the auxiliary top member there are cables 55, the cables 55 passing over pulleys 56, there being weights 57 secured to the cables 55 to hold the auxiliary top member 50 normally in the position illustrated in Figure 1.

The shaft 34 is connected with a motor 58, this motor 58 having a circuit, as illustrated in Figure 5 of the drawings, and being provided with a switch 59, which may be disposed adjacent the cashier's or teller's window 12, and another switch 60 which will be normally closed, but which will be opened by the engagement of the auxiliary top member 50 with the portion 61 of the switch when the auxiliary top member 50 is moved to close the opening 13, and which will serve to open the switch 60. This will be readily understood by referring to Figures 3 and 5 of the drawings, the construction being such that when the auxiliary top member 50 has been moved to a position to close the opening 13, it will serve to open the switch 60 and thereby open the circuit connected with the electric motor 58. As will best be seen by referring to Figures 1 and 2 of the drawings, there is a lock member 62 pivoted at 63 at the rear of the top of the cage 10, this lock member 62 being positioned to engage the rear of the auxiliary top member 50 when the auxiliary top member 50 has been moved to close the opening 13, and as best illustrated in Figure 2 of the drawings.

The pivoted lock member 62 has a depending weighted arm 64 which serves to hold the lock member 62 yieldingly to move upwardly into engagement with the rear of the auxiliary top member 50 when the auxiliary top member 50 has been moved as stated above.

With the parts in the positions illustrated in Figure 1 of the drawings, should occasion require, the teller or cashier may close the switch 59, which will energize the electric motor 58 and by the chain of gears the bar 26 will be moved from under the guide member 18, permitting the guide member 18 and the top member 14 to fall to the position indicated by the dotted lines in Figure 1, it being understood that this movement will take place in a second or two, after which the arm or movable frame 37 will be moved to the position indicated by the dotted lines in Figure 1, which will disconnect the motor from the bar 26, while permitting the motor to continue to draw on the cables 48 for quickly moving the auxiliary top member 50 to the position illustrated in Figures 2 and 3 of the drawings, when the switch 60 will be opened to open the circuit connected with the motor and the lock member 62 will be moved into operative position to lock the auxiliary top member.

It will, of course, be understood that the lock member 62 is enclosed by a metal casing 65 and that the cage 10, as well as the auxiliary top member 50, is preferably constructed of metal.

What is claimed is:

1. In a device of the class described, a cage open at its top, a hinged member for closing the opening, means for holding the member in position at the opening, guideways at the sides of the opening, an auxiliary member for moving in the guideways for closing the opening, and electrical means for freeing the first mentioned means and for moving the auxiliary member to close the opening.

2. In a device of the class described, a cage having an opening, a member for closing the opening, means for holding the member at the opening, a bar for holding the means in operative position, an auxiliary member for closing the opening, a second means for moving the auxiliary member to close the opening, means connecting the second mentioned means with the bar to move the bar to free the first mentioned means, and means cooperating with the bar and the third mentioned means to disconnect the bar from the second mentioned means when the bar has moved a predetermined distance.

3. In a device of the class described, a cage having an opening in its top, a member for closing the opening, a bar having teeth, means cooperating with the bar and the member for supporting the latter, a train of gears having engaging teeth, the train of gears being connected with the teeth on the bar for moving the bar, means for operating the train of gears, and means operable by a movement of the bar to disconnect the teeth and free the bar from movement by the train of gears.

4. In a device of the class described, a cage having an opening in its top, a member for closing the opening, a bar having teeth, means cooperating with the bar and the member for supporting the latter, a gear meshing with the teeth on the bar, a shaft, a gear secured to the shaft, an arm mounted on the shaft, a gear mounted on the arm for normally connecting the first and second mentioned gears, and means cooperating with the bar and the arm to move the arm to disconnect the third mentioned gear from the first mentioned gear.

5. In a device of the class described, a cage having an opening in its top, a member for closing the opening, a bar having teeth, means cooperating with the bar and the member for supporting the latter, a gear meshing with the teeth on the bar, a shaft, a gear secured to the shaft, an arm mounted on the shaft, a gear mounted on the arm for normally connecting the first and second mentioned gears, and a link secured to the bar having a bearing in which the arm is slidably disposed for moving the arm to disconnect the third mentioned gear from the first mentioned gear.

6. In a device of the class described, a cage having an opening in its top, a member for closing the opening, a bar having teeth, means cooperating with the bar and the member for supporting the latter, an auxiliary member for closing the opening, means for moving the auxiliary member to close the opening, a gear meshing with the teeth on the bar, a shaft, a gear secured to the shaft, an arm mounted on the shaft, a gear mounted on the arm and normally connecting the first and second mentioned gears, means cooperating with the bar and the arm to move the arm to disconnect the third mentioned gear from the first mentioned gear, and means to rotate the shaft and operate the second mentioned means.

7. In a device of the class described, a cage having an opening in its top, a member for closing the opening, a bar having teeth, means cooperating with the bar and the member for supporting the latter, guideways at sides of the opening, an auxiliary member for moving in the guideways for closing the opening, a gear meshing with the teeth on the bar, a pivoted arm, a gear mounted on the arm and normally engaging the first mentioned gear, a shaft, a gear train connecting the shaft with the second mentioned gear, a link connecting the bar with the arm for moving the arm to disconnect the first and second mentioned gears, and means cooperating with the arm and the shaft for moving the auxiliary member in the guideways.

8. In a device of the class described, a cage open at its top, a hinged member for closing the opening, a guideway with a vertically extending slot, a guide member disposed in the guideway and having an arm movable in the slot, a link articulated to the member and to the arm, there being an opening in the guideway and a bar movably disposed in the opening for engaging and supporting the guide member.

9. In a device of the class described, a floor having an opening, a cage disposed below the opening, a member for closing the opening, a second member for engaging the first mentioned member and extending downwardly therefrom for holding the first mentioned member in position to close the opening, means for holding the second mentioned member in operative position, an auxiliary member for closing the opening, and means for freeing the first mentioned means and for moving the auxiliary member into position to close the opening.

10. In a device of the class described, a floor having an opening, a member hinged relatively to the floor for closing the opening, a second member engaging the underside of the first mentioned member and extending downwardly therefrom for holding the first mentioned member in position to close the opening, means for holding the second mentioned member in operative position, an auxiliary member for closing the opening, means for freeing the first mentioned means and for moving the auxiliary member into position to close the opening, and means under the control of the operator for operating the last mentioned means.

11. In a device of the class described, a cage having an opening, a member for closing the opening, means for holding the member in position at the opening, guideways at sides of the opening, an auxiliary member for moving in the guideways to close the opening, means for freeing the first mentioned means, means for moving the auxiliary member to close the opening, means for operating the second and third mentioned means, and means cooperating with the second and fourth mentioned means to disconnect the second mentioned means from the fourth mentioned means while the movement of the third mentioned means is continued by the fourth mentioned means.

12. In a device of the class described, a cage having an opening, a member for closing the opening, means for holding the member at the opening, a bar for holding the means in operative position, operating means for moving the bar to free the first mentioned means, means for operating the operating means, and means cooperating with the second and third mentioned means to disconnect the second mentioned means from the third mentioned means when the bar has moved a predetermined distance.

FRANK E. ECKERSON.